United States Patent Office 2,793,040
Patented May 21, 1957

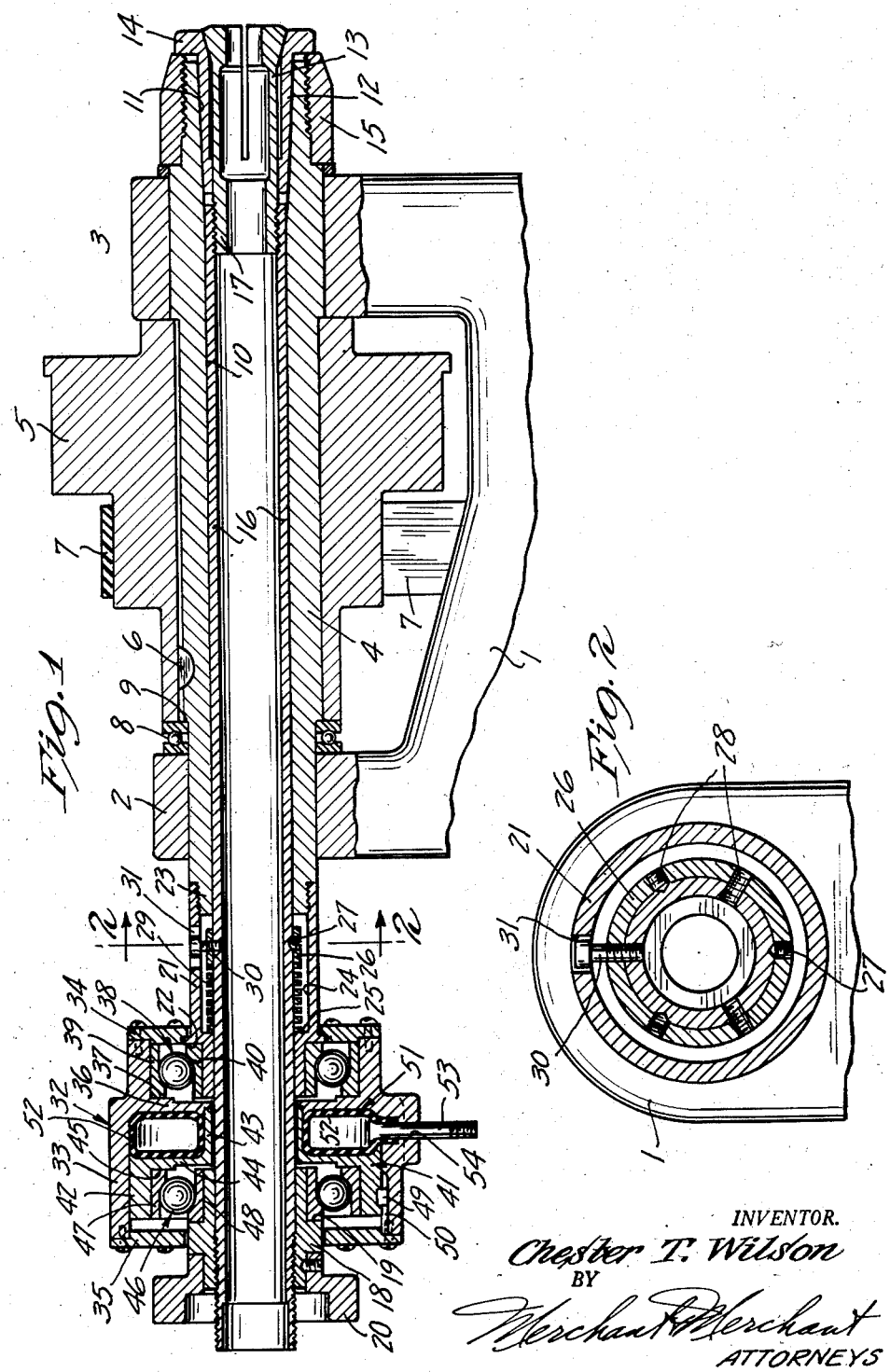

2,793,040

COLLET CLOSER

Chester T. Wilson, Minneapolis, Minn.

Application August 26, 1953, Serial No. 376,709

1 Claim. (Cl. 279—4)

My invention relates generally to chucks for machine tools, and more particularly to improvements in collet closing mechanisms adapted for use with machine tools such as lathes, screw machines, drill presses, boring machines and the like.

More specifically, the present invention is in the nature of a collet closer which utilizes fluid under pressure for closing a normally open split collet generally used to firmly hold a work piece.

An important object of my invention is the provision of a collet closer which may be readily controlled to apply a predetermined amount of holding pressure to the collet upon the work piece.

Another object of my invention is the provision of a collet closer which may be quickly and easily applied to a machine tool.

Another object of my invention is the provision of a collet closer of the type set forth including a stationary housing and antifriction bearing means for preventing transference of rotation of the rotary collet engaging portions of the closer to the housing thereof.

Still another object of my invention is the provision of a fluid pressure operated collet closer, portions of which define an expansion chamber, and of novel leak-proof means in said expansion chamber for preventing leakage of fluid therefrom.

A still further object of my invention is the provision of a collet closer of the type set forth which will automatically compensate for commercial variations in sizes of work piece material handled thereby.

Another object of my invention is the provision of a collet closer which is relatively simple and inexpensive to produce which is highly efficient in operation and which is rugged in construction and durable in use.

The above and still further highly important objects and advantages of my invention will become apparent from the following detailed specification, appended claims and attached drawings.

Referring to the drawings, which illustrate the invention, and in which like characters indicate like parts throughout the several views:

Fig. 1 is a view in axial section of the headstock of a lathe showing my novel collet closer mounted thereon, some parts being broken away; and Fig. 2 is an enlarged transverse section taken substantially on the line 2—2 of Fig. 1.

Referring with greater detail to the drawings, a headstock 1 of a conventional lathe, not shown, includes a pair of spaced bearing elements 2 and 3 which journal a hollow rotary spindle 4. A conventional step pulley 5 is keyed to the spindle 4 as indicated at 6. Rotary movement is imparted to the spindle 4 by a drive belt 7 fragmentarily shown in Fig. 1, which belt 7 may be assumed to be driven by a suitable source of power such as a drive motor, not shown. A thrust bearing 8 is interposed between the bearing 2 of the headstock 1 and an annular shoulder 9 formed on the spindle 4.

The inner cylindrical wall 10 of the spindle 4 is tapered at one end as indicated at 11 to receive a collet constrictor 12 which is adapted to receive a conventional split collet 13. The collet constrictor 12 is of conventional design having at its outer end an annular flange or head 14 which abuts a cylindrical nose piece 15 that is screw threaded onto the adjacent end of the spindle 4. The collet, constrictor and nose piece are all of a type commonly used in the machine tool art, and in themselves do not comprise the instant invention.

Mounted for axial sliding movements in the spindle 4 and for common rotation therewith is a drawbar in the nature of a tubular sleeve 16 the front end of which is screw threaded onto the reduced rear end 17 of the collet 13. At its rear end, the collet engaging sleeve 16 is screw threaded to receive a tubular thrust element or ring 18 which defines an annular shoulder 19. The ring 18 is provided with an enlarged head 20 by means of which the same is screw threaded onto the sleeve 16. A second tubular thrust element 21 is slidably mounted on the sleeve 16 in axially spaced relation to the thrust element 18, and defines an annular shoulder 22 which opposes the annular shoulder 19 of the thrust element 18. At its front end, the thrust element 21 is screw threaded onto the reduced threaded rear end 23 of the spindle 4. The tubular thrust member 21 is formed to provide a recess 24 the inner end of which provides an annular shoulder 25. An abutment in the nature of a collar 26 encompasses the sleeve 16 within the recess 24 and is anchored to the sleeve 16 by a set screw or the like 27 which is screw threaded into a selected one of a plurality of circumferentially spaced threaded openings 28 extending radially through the collar 26. A coil compression spring 29 is interposed between the abutment-forming collar 26 and the annular shoulder 25 on the tubular thrust element 21 whereby to yieldingly urge the sleeve 16 in a direction to cause opening of the collet 13. A key in the nature of a headed bolt or screw 30 is screw threaded into one of the threaded openings 28 of the collar 26, the head of said screw being contained in an axially elongated slot 31 in the tubular thrust element 21. By this means, rotary movement is positively transferred from the spindle 4 to the collet engaging sleeve or drawbar 16, while relative axial sliding movement is permitted therebetween.

My novel collet closer further includes a stationary housing 32 comprising a generally cylindrical wall 33, opposed end walls 34 and 35 and an intermediate annular partition or wall 36 which defines an annular shoulder portion 37. That portion of the cylindrical wall 33 between the partition 36 and the end wall 34 encompasses the rear end portion of the tubular thrust member 21 and provides a seat for the outer race of an antifriction bearing 38, the outer race of which is indicated at 39. Said outer race 39 is held snugly between the end wall 34 of the housing and the shoulder 37 of the intermediate wall or partition 36. The inner race 40 of the antifriction bearing 38 is snugly received on the inner end portion of the tubular thrust element 21 and abuts the annular shoulder 22 thereon. The bearing 38 is preferably of the angular thrust ball-type which is capable of carrying both radial and thrust loads.

An annular plunger 41 is axially slidably mounted in the rear end portion of the housing 32 and comprises a diametrically enlarged annular portion 42 which encompasses the front end portion of the tubular thrust element 18, a diametrically reduced front end portion 43 which loosely encompasses the sleeve 16 between the tubular thrust elements 18 and 21, and a connecting annular partition 44 which defines an annular shoulder 45. An antifriction bearing 46 has its outer race 47 carried by the diametrically enlarged portion 42 and in abutting relationship to the annular shoulder 45 of the partition 44. The inner race 48 of the bearing 46 is snugly received on the front end portion of the tubular thrust element 18 and abuts the annular shoulder 19 thereof. It will be noted that the bearing 46 is also of the angular thrust variety and is disposed in opposed relationship to the bearing 38. A key 49 carried by the plunger 41 moves within a keyway 50 in the cylindrical wall 33 of the housing 32 to permit axial sliding movement of the plunger 41 while locking the same against rotary movement with respect to the housing 32. From the above it will be noted that the bearing 38 mounts the housing 32 on the tubular thrust member 21, while the bearing 46 mounts the annular plunger 41 on the thrust element 18 for common axial movements therewith relative to the housing 32 and thrust member 31.

The housing 32 and the plunger 41 cooperate to define an annular expansion chamber 51 which contains an annular inflatable elastic bag 52. The bag 52 is of a normal size to substantially fill the chamber 51 and is fitted with a rigid conduit 53 through which fluid under pressure may be admitted to and removed from the interior of the bag. Preferably, the conduit 53 extends radially outwardly through a suitable opening 54 in the housing 32 and is preferably sufficiently rigid to hold the housing against rotation which might otherwise be imparted thereto through the antifriction bearings 38 and 46. The conduit 53 is adapted to be connected to a source of fluid under pressure, not shown. Any suitable means, such as a control valve, not shown, may be interposed in the conduit 53 for admitting fluid, such as air, to the interior of the bag 52. Such a valve may also include means for controlling the pressure at which the fluid is introduced to the bag interior. With such a control, the collet 13 may be caused to grip a work piece with any desired degree of pressure. With this arrangement, relatively thin walled tubing may be worked in the machine without danger of the tubing being distorted or collapsed by the collet.

From the above it will be seen that, when air or other fluid is introduced under pressure to the interior of the bag 52, resultant expansion of the bag 52 axially of the device will cause rearward movement of the plunger 41 and the tubular thrust element 18. The thrust element 18, being screw threaded on the sleeve 16, such rearward movement will be transferred to the collet 13 to cause closing of the same against a work piece. Obviously this axial movement is made against the yielding bias of the spring 29 which, when air is released from the interior of the bag 52, will impart forward axial movement to the sleeve 16 to open the collet 13 to release the work piece. Obviously the axial thrust set up by the pressure within the bag 52 is transferred within the thrust elements 18 and 21 by the antifriction bearings 38 and 46 which enable the spindle 4 and the collet equipped sleeve 16 to rotate continuously during opening and closing of the collet 13, so that a minimum of time is involved in advancing the work piece through the collet.

Inasmuch as the extent of movement of the plunger 41 in a collet closing direction is dependent only upon the size of the work piece carried by the collet and the amount of pressure exerted by the fluid within the bag 52, no adjustment need be made in the collet closer to compensate for variations in the diameter of the work piece within commercial tolerances thereof. I have found that, with the use of this device controlled by either a hand or a foot operated valve, operator fatigue has been reduced to a minimum and production costs when machining like pieces in quantity have been also substantially reduced. Furthermore, the use of the inflatable elastic bag 52 has obviated the necessity for extremely close machining tolerances between the inside of the housing 32 and the plunger 41 and dispensing with the necessity for troublesome sealing rings or washers.

While I have shown and described a preferred embodiment of my novel collet closer, it will be understood that the same is capable of modification without departure from the spirit and scope of the invention as defined in the claim.

What I claim is:

In a collet closer for a lathe having a collet supporting tubular spindle mounted for rotation in the head stock thereof, said collet closer comprising a rotary tubular collet engaging sleeve adapted to be axially slidably mounted in the spindle and having means for mounting a collet at one end thereof, a tubular thrust element axially slidably mounted on said sleeve adjacent the other end portion thereof, said thrust element having means thereon for anchoring the same to the tubular spindle of said lathe for common rotation therewith, a second tubular thrust element mounted on said other end of the sleeve in axially spaced relation to said first mentioned thrust element and for common rotation with said sleeve, yielding means urging said sleeve-mounted element in a direction of axial movement to open the collet, a stationary housing operatively carried by one of said thrust elements, a non-rotary plunger operatively carried by the other of said thrust elements for axial movements with respect to said housing, said housing and plunger defining an expansion chamber, an inflatable elastic bag in said chamber, said bag being of a normal size to substantially fill said chamber, means for admitting fluid under pressure to said bag to cause the same to inflate sufficiently to move the plunger in one direction to impart collet-closing movements to said sleeve through the thrust element mounted thereon and against bias of said yielding means, an annular abutment collar rigidly mounted on said sleeve, the spindle-engaging thrust element encompassing said collar and having an axially elongated slot therein, and a coupling member extending radially outwardly from said abutment collar and into said slot for relative axial movement therein, said yielding means comprising a coil compression spring encompassing said sleeve and interposed between said spindle-engaging thrust element and said abutment collar.

References Cited in the file of this patent

UNITED STATES PATENTS

| | | |
|---|---|---|
| 826,501 | Hanson | July 17, 1906 |
| 2,455,586 | Kooima | Dec. 7, 1948 |
| 2,509,673 | Church | May 30, 1950 |
| 2,620,196 | Church | Dec. 2, 1952 |